US012297828B2

(12) United States Patent
Noack

(10) Patent No.: US 12,297,828 B2
(45) Date of Patent: May 13, 2025

(54) METHOD FOR CONTROLLING A HYDRAULIC DRIVE AND HYDRAULIC DRIVE

(71) Applicant: Robert Bosch GmbH, Stuttgart (DE)

(72) Inventor: Henning Noack, Lohr am Main (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 18/456,687

(22) Filed: Aug. 28, 2023

(65) Prior Publication Data

US 2024/0084828 A1 Mar. 14, 2024

(30) Foreign Application Priority Data

Sep. 14, 2022 (DE) ..................... 10 2022 209 605.3

(51) Int. Cl.

*F04B 9/113* (2006.01)
*F04B 49/06* (2006.01)
*F04B 49/20* (2006.01)
*F15B 9/04* (2006.01)
*F15B 21/00* (2006.01)

(52) U.S. Cl.

CPC ............ *F04B 9/113* (2013.01); *F04B 49/065* (2013.01); *F04B 49/20* (2013.01); *F15B 9/04* (2013.01); *F15B 21/00* (2013.01)

(58) Field of Classification Search

CPC .. F04B 9/08; F04B 9/113; F04B 49/06; F04B 49/065; F04B 49/20
USPC ........................................................... 60/476
See application file for complete search history.

(56) References Cited

U.S. PATENT DOCUMENTS

| | | | | |
|---|---|---|---|---|
| 5,778,671 A * | 7/1998 | Bloomquist | .......... | F15B 21/087 60/464 |
| 10,302,074 B2 * | 5/2019 | Trieb | .................... | F04B 49/022 |
| 10,422,326 B2 * | 9/2019 | Sato | ........................ | F04B 49/22 |
| 2016/0084241 A1 * | 3/2016 | Sato | ........................ | F04B 1/295 417/222.1 |
| 2016/0108939 A1 * | 4/2016 | Trieb | ...................... | F04B 17/03 60/545 |

(Continued)

FOREIGN PATENT DOCUMENTS

EP 2 998 579 B1 5/2020

*Primary Examiner* — Michael Leslie
(74) *Attorney, Agent, or Firm* — Maginot, Moore & Beck LLP

(57) ABSTRACT

Controlling a hydraulic drive for a hydraulic consumer alternately pressurized in opposite directions, the hydraulic drive comprising a hydraulic machine driven by an electric machine and featuring variable displacement adjustable through zero, wherein a rotational speed of the hydraulic machine controlled by the electric machine, includes varying displacement so that conveying direction of hydraulic fluid is alternated using a cyclically varying volumetric flow specification, to perform direction reversals. After direction reversal during a first change time period, the rotational speed is increased from a first rotational speed set at the end of the direction reversal to a second rotational speed, and within a second change time period after the first change time period, the rotational speed is decreased until the first rotational speed is reached. The displacement is varied during the change time periods depending on the rotational speed and volumetric flow specification to comply with the volumetric flow specification.

17 Claims, 3 Drawing Sheets

(56) References Cited

U.S. PATENT DOCUMENTS

2024/0084829 A1* 3/2024 Guender ................. F15B 7/006

* cited by examiner

METHOD FOR CONTROLLING A HYDRAULIC DRIVE AND HYDRAULIC DRIVE

This application claims priority under 35 U.S.C. § 119 to application no. DE 10 2022 209 605.3, filed on Sep. 14, 2022 in Germany, the disclosure of which is incorporated herein by reference in its entirety.

The present disclosure relates to a method for controlling a hydraulic drive for a hydraulic consumer alternately pressurized in opposite directions during operation, a hydraulic drive and a hydraulically driven device, as well as a computing unit and computer program for performing the method.

BACKGROUND

Machines in which an element is alternately moved in opposite directions can be hydraulically driven. For example, for piston compressors used to compress gases, a dual-acting hydraulic cylinder having two chambers supplied with pressurized hydraulic fluid can be provided so that a piston located between the two chambers alternately moves in opposite directions. The chambers can be connected to a hydraulic drive which comprises an electrically driven hydraulic pump and is configured or can be controlled to pump hydraulic fluid back and forth between the chambers or between chambers connected to the chambers.

SUMMARY

Proposed according to the present disclosure is a method for controlling a hydraulic drive, a hydraulic drive, and a hydraulically driven device, as well as a computing unit and a computer program for performing the method comprising the features of the disclosure. Advantageous embodiments are the subject matter of the disclosure and the description hereinafter.

The disclosure makes use of the measure, in a hydraulic drive for a hydraulic consumer or consumer that is pressurized in opposite directions during operation, that (i.e., the hydraulic drive) comprises a hydraulic machine with variable displacement driven by an electric machine, the displacement being varied (i.e., varied through zero) so that hydraulic fluid is alternately conveyed through the hydraulic machine in opposite conveying directions according to a cyclically varying volumetric flow specification, after (at least) one respective direction reversal of the conveying direction during a first change time period in order to increase the rotational speed starting from a first rotational speed (which is in particular set at the end of the direction reversal) to a second rotational speed, and during a second change time period after the first change time period, the rotational speed is reduced until the first rotational speed is reached. The displacement during the first and second change time periods is varied depending on the rotational speed and volumetric flow specification in order to correspond to the volumetric flow specification. This measure first converts hydraulic energy into kinetic energy and subsequently converts back to hydraulic energy. This intermediate storage in the form of kinetic energy is advantageous because elements that convert the energy into heat (e.g., resistors or throttle valves) or elements that buffer electrical energy (e.g., capacitors) can be largely dispensed with. In particular, heat generation and conversion losses of mechanical to electrical energy are avoided.

The volumetric flow specification can be given by signed values or as a signed function of time, whereby different signs correspond to the two different conveying directions of the hydraulic machine. Accordingly, the displacement (i.e., volume conveyed by the hydraulic machine per revolution) can also be considered a signed value. The volumetric flow specification is time dependent and can change during the first and/or the second time periods. The fact that the volumetric flow specification is met means that the displacement is varied when the rotational speed is controlled at a particular timepoint so that the resulting volumetric flow equals the volumetric flow specification at the respective timepoint.

T volumetric flow specification being intended to "vary cyclically" means that the volumetric flow specification as a function of time is a periodic function, which varies between positive and negative values according to the conveying direction reversal. A cycle is formed by one period of the volumetric flow specification considered as a function of time, and a half-cycle is correspondingly formed by one-half of a period.

The rotational speed is considered a positive quantity, i.e., the second rotational speed is greater than the first rotational speed. The first and second rotational speeds are in particular predetermined.

The terms rotational speed, displacement, and volumetric flow specification refer in particular to the rotational speed, displacement, and volumetric flow specification controlled or desired at one timepoint. The presently existing rotational speed, displacement, and/or the actual volumetric flow at the respective timepoint can deviate from this, e.g., due to a delay in setting, control, or regulation.

When it is specified hereinafter that a time period is "before" or "after" another time period, this is understood to mean "time before" or "time after".

In one embodiment, during a first hold time period after the first change time period and before the second change time period, the rotational speed remains unchanged (i.e., the rotational speed is not varied), the displacement during the first hold time period being varied depending on the rotational speed and the volumetric flow specification in order to correspond to the volumetric flow specification. By keeping the rotational speed longer at the higher second rotational speed, a higher volumetric flow specification can be met (because displacement cannot be increased at will, but is limited by the design of the hydraulic machine). This enables an optimization of the cycle time, e.g., as short a cycle time as possible. The total time period between a direction reversal and the subsequent direction reversal can be formed by the first change time period, the first hold time period, and the second change time period. It is also conceivable that there be no first hold time period, in which case the second change time period in particular immediately follows the first change time period.

In one embodiment, during a second hold time period after the second change time period, the rotational speed remains unchanged, the displacement during the second hold time period being varied depending on the rotational speed and the volumetric flow specification in order to correspond to the volumetric flow specification. The total time period between a direction reversal and the subsequent direction reversal can be formed by the first change time period, the second change time period, and the second hold time period. It is also conceivable that there is no second hold time period, the direction reversal immediately following the second change time period in particular.

In one embodiment, the respective direction reversal extends over a reversal time period, whereby, during the reversal time period, there is a displacement sign change, the displacement during the reversal time period being varied depending on the rotational speed and the volumetric flow specification in order to correspond to the volumetric flow specification, the rotational speed during the reversal time period in particular remaining unchanged. The reversal time period can immediately follow the second change time period or the first hold time period. The first change time period can immediately follow the reversal time period.

In one embodiment, the chronological lengths of the first change time period and the second change time period are predetermined. Furthermore, the chronological length of the first hold time period and/or optionally the chronological length of the second hold time period time and/or optionally the chronological length of the reversal time period can be predetermined as appropriate. The chronological sequence of the method is thus largely defined so that the cycle sequence can be controlled accordingly. The term "cycle sequence" refers to the alternating process of conveying hydraulic fluid in opposite directions.

In one embodiment, at least one reversal signal is determined or sensed based on signals from at least one position sensor and/or end position sensor arranged on the hydraulic consumer, the respective direction reversal being performed in response to the at least one reversal signal. As a result, automatic control of the cycle sequence is achieved without defining at least some of the chronological lengths of the time periods (e.g., the third time period). Accordingly, an automatic adaptation to changes in operating conditions is achieved.

In one embodiment, in (i.e., during) the first and second change time periods, and/or the first and second hold time periods, and/or the reversal time periods, the displacement is varied so that the product of the displacement and the rotational speed remains equal to the volumetric flow specification. The equality of the volumetric flow specification and the product of the displacement and rotational speed should apply to all timepoints during the respective time period, even if the volumetric flow specification varies during the respective time period. In particular, the displacement in or during all time periods (first and second change time period, first and second hold time period and reversal time period) is varied so that the product of the displacement and the rotational speed remains equal to the volumetric flow specification.

Furthermore, if at least one additional time period is included in the cycle expiry, which is not included in the specified time periods (first, second change time period, first, second hold time period, reversal time period), then the displacement can also be varied in or during this at least one additional time period in order to ensure that the product of the displacement and the rotational speed remains equal to the volumetric flow specification. In particular, it is provided that the specified time periods (first, second change time period, first, second hold time period, reversal time period) cover the entire time period of a half-cycle. In other words, there is no additional time period other than the specified time periods.

A computing unit according to the disclosure, e.g., a control unit of a hydraulic drive, is configured, in particular in terms of program technology, so as to perform a method according to the disclosure.

A hydraulic drive according to the disclosure, e.g., a compression device for gases, comprises an electric machine, a hydraulic machine which is driven by the electric machine and features variable displacement, the latter being adjustable through zero, a rotational speed of the hydraulic machine being adjustable by controlling the electric machine, and a computing unit according to the disclosure.

A hydraulically driven device according to the present disclosure, in particular a compression device, comprises a hydraulic consumer and a hydraulic drive according to the present disclosure.

The implementation of a method according to the disclosure in the form of a computer program or computer program product with program code for performing all of the method steps is also advantageous, because doing so results in particularly low costs, in particular if an executing control device is also used for further tasks and is therefore provided in any event. Suitable data media for providing the computer program in particular include magnetic, optical, and electric storage media, e.g., hard disks, flash memory, EEPROMs, DVDs, etc. The download of a program via computer networks (internet, intranet, etc.) is also possible.

Additional advantages and embodiments of the disclosure follow from the description and the enclosed drawings.

It is understood that the features specified hereinabove and the features yet to be explained hereinafter can be used not only in the respectively specified combination, but also in other combinations, or alone, without departing from the scope of the present disclosure.

The disclosure is thoroughly illustrated schematically in the drawings on the basis of exemplary embodiments and is described hereinafter with reference to the drawings.

The term "line" (or equivalently hydraulic line) is generally intended to refer to a line, passage, or the like, having at least two openings (hydraulic input, output, connection or the like) through which hydraulic fluid can flow into or out of the line. In a line, (at least) one active or passive hydraulic control element (e.g., valve) can be provided that influences the flow of hydraulic fluid between the openings. In other words, a line can comprise a plurality of line segments, whereby a hydraulic element is provided between two line segments. For the sake of linguistic simplicity, the formulation that hydraulic element (valve) is provided in the line is used.

The term "hydraulic connection" or "hydraulically connected" is generally intended to mean that a volumetric flow of hydraulic fluid can occur between elements connected by a hydraulic connection (hydraulically connected), wherein a hydraulic control element (e.g., valve) can also be provided here in the hydraulic connection in order to control the volumetric flow. Hydraulically connected elements are thus connected by a line (in the above context).

DETAILED DESCRIPTION

Figure 1:
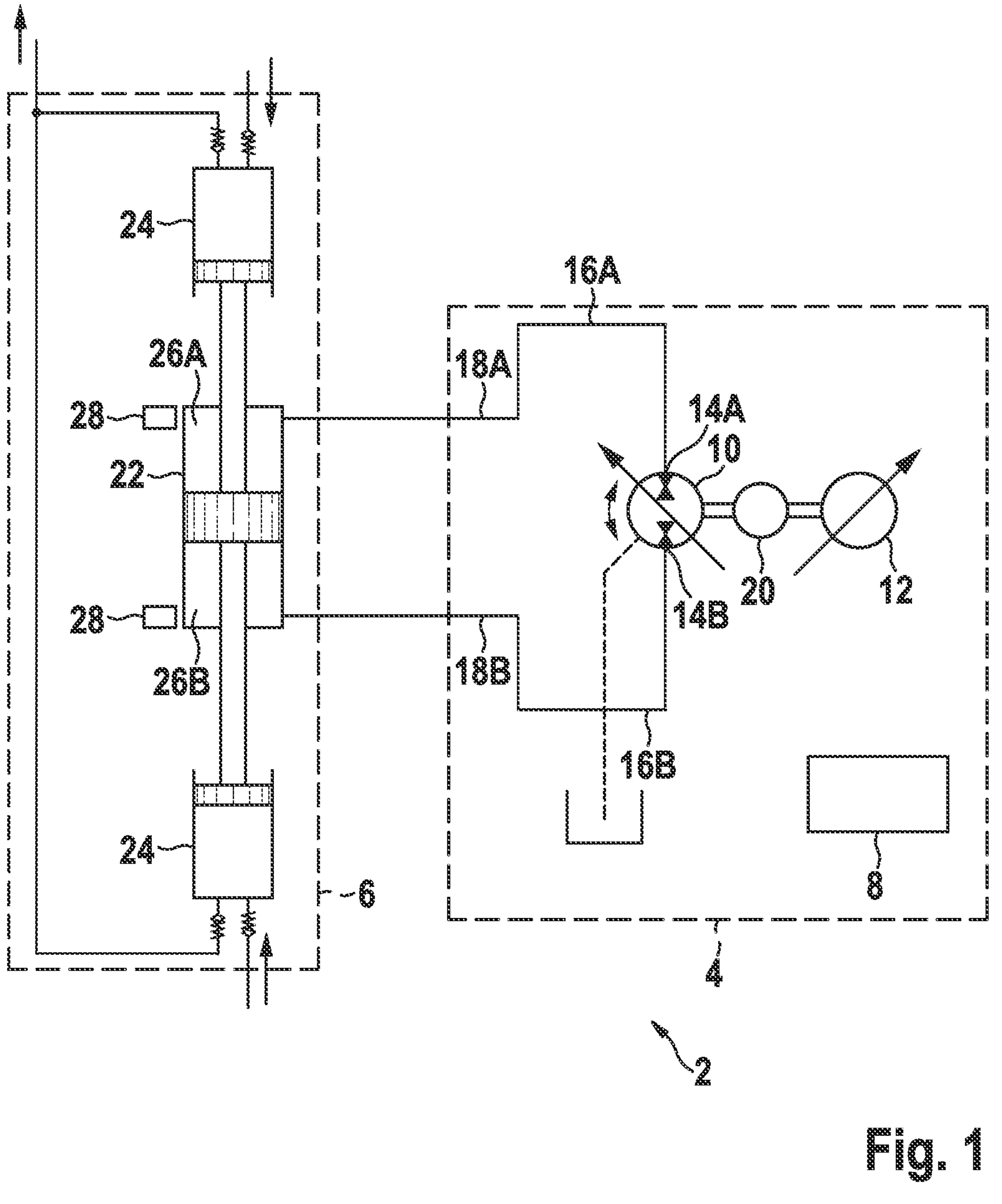
FIG. 1 shows a compression device comprising a hydraulic drive, which is used as the drive of a piston compressor.

FIG. 1 shows a compression device 2 (e.g., for gases) with a hydraulic drive 4, which is used as a hydraulic drive of a piston compressor 6. Only the conceptual design of the compression device is shown. The compression device can be considered as one example of a hydraulically driven device, in which case the hydraulic drive or its controller can of course also be used in other hydraulically driven devices insofar as it comprises a hydraulic consumer (a hydraulic cylinder or hydraulic motor) which is supplied with pressurized hydraulic fluid alternately in opposite directions, a closed hydraulic circuit in particular being formed.

The hydraulic drive 4 (also referred to as a hydraulic aggregate) comprises an variable hydraulic machine 10 (hydraulic machine, i.e., configured to act as both a hydraulic pump and a hydraulic motor) which is adjustable through zero and is driven by an electric machine 12 (operable both by motor and generator means). The electric machine can be considered part of the hydraulic drive. The hydraulic machine 10 is coupled to the electric machine 12, e.g., via a shaft and/or a transmission and/or a clutch. The rotating masses of this arrangement, of the hydraulic machine 10, including the electric machine 12 coupled thereto, have a moment of inertia J, which is indicated in this drawing by a circle 20. The circle 20 is merely intended to symbolize the moment of inertia and not represent an actual component. The moment of inertia J is formed by the moments of inertia of the rotor of the electric machine, the hydraulic machine, and the shaft and/or transmission and/or the clutch connecting thereto. In rotation at an angular velocity ω, the kinetic energy E of these rotating masses is $E=\frac{1}{2}\cdot J\cdot\omega^2$. In this context, it is understood that the hydraulic machine and the electric machine have the same rotational speed (in the case of a transmission having one of different transmission ratios, the different rotational speeds are to be taken into account accordingly). The moment of inertia/can be increased by applying an additional flywheel mass.

A first work output 14A of the hydraulic machine 10 is connected to a hydraulic first drive output 18A of hydraulic drive 4 via a hydraulic first line 16A (this side is also referred to as an A-side). A second work output 14B of hydraulic machine 10 is connected to a hydraulic second drive output 18B of hydraulic drive 4 via a hydraulic second line 16B (this side is also referred to as a B-side). The hydraulic machine 10 can, e.g., be an axial piston machine with variable swing angle or variable displacement (i.e., the volume of hydraulic fluid conveyed during each revolution). The swing angle or displacement can be varied through zero, i.e., the direction of the volumetric flow of the hydraulic fluid (typically a hydraulic oil) can be changed by the hydraulic machine (with unchanged rotational direction of a drive shaft of the hydraulic machine or electric machine respectively), whereby different signs of the swing angle or displacement correspond to different directions of the volumetric flow. The volumetric flow takes place optionally (by corresponding control of the hydraulic machine) from the A-side to the B-side (e.g., a positive sign of the swing angle or displacement respectively) or from the B-side to the A-side (e.g., a negative sign of the swing angle or the displacement). The pressure of the hydraulic fluid in the first line 16A is also referred to as A-pressure. The pressure of the hydraulic fluid in the second line 16B is also referred to as B-pressure.

The hydraulic drive 4 serves to pressurize a hydraulic consumer (e.g., a double-acting hydraulic cylinder 22 as shown) alternately in opposite directions, i.e. hydraulic fluid is to be alternatively pumped via the first drive output 18A and the first line 16A to a first side (A-side) of the consumer, while discharging hydraulic fluid from a second side (B-side) of the consumer via the second drive output 18B and/or the second line 16B, and via second drive output 18B and the second line 16B to the second side (B-side) of the consumer, while simultaneously draining hydraulic fluid from the first side (A-side) of the consumer via the first drive output 18*a* and the first line 16A. For this purpose, the swing angle and the displacement volume of the hydraulic machine 10 respectively is alternately varied through zero. The A-side and B-side are alternately a low-pressure side and a high-pressure side respectively.

An electronic controller 8 (computing unit) is further shown, which can in particular be included in the hydraulic drive 4 as shown, or can, e.g., also be part of a controller of the compression device 2. The controller 8 is configured to control the hydraulic drive 4, i.e., in particular to generate control signals for the elements (e.g., hydraulic machine 10, electric machine 12).

The electronic controller 8 can be configured to receive input variables based on which output variables (e.g., some of the control signals) are determined. Input variables are generally variables (measured values or the like) that describe the state of the hydraulic drive 4 and/or a hydraulic consumer connected to the drive outputs 18A, 18B. For example, the former can be one or more of: rotational speed and/or swing angle of the hydraulic machine, cycle profile. The latter can be, for example, signals from a position sensor (e.g., path sensor) and/or position sensor (e.g., end position sensor) of the consumer (e.g., hydraulic cylinder). For this purpose, a corresponding computer program can be provided in the controller, which in particular can determine control signals for the hydraulic machine to set the swing angle or the displacement, and the electric machine or its inverter to set the rotational speed of the electric machine and thus also the hydraulic machine. The computer program, when performed by a processor of the computing unit, implements in particular a method of controlling the hydraulic drive according to the present application.

In addition to the elements shown, the hydraulic drive 4 can include further elements which are not shown. For example, pressure relief valves can be provided between the first and second lines. For example, two pressure relief valves acting in the opposite direction so that if the pressure of the high-pressure side exceeds a pressure threshold (set at the respective pressure relief valve), a volumetric flow of hydraulic fluid from the high-pressure side to the low-pressure side is enabled. A purging device can, e.g., also be provided, which diverts hydraulic fluid from the first or second line by means of an exit device and returns it to the same via a feed device. A purging device in particular enables filtering and cooling of the hydraulic fluid, e.g., by means of filter and cooling devices provided in the purging device. Likewise, a feed pressure of the purge device can be selected such that the hydraulic machine has a correct suction ratio (the purge device can comprise a tank).

The piston compressor 6 (the construction and function of which is known to the skilled person) comprises a dual-acting hydraulic cylinder 22 having two chambers 26A, 26B, whereby a first chamber 26A is hydraulically connected to first drive output 18A of the hydraulic drive 4, and a second chamber 26B is hydraulically connected to second drive output 18B of hydraulic drive 4. The double-acting hydraulic cylinder 22 can be considered a hydraulic consumer supplied with pressurized hydraulic fluid by the hydraulic drive 4. The piston of the double-acting hydraulic cylinder 22 is connected via rods to pistons and compression pistons of two compression cylinders 24 to move them. During operation, each of the compression cylinders 24 alternately draws in a gas to be compressed through appropriately arranged check valves, compresses it, and discharges the compressed gas through an outlet line (indicated by arrows).

Two or more limit switches or end position sensors 28 can be provided on the double-acting hydraulic cylinder 22, which are configured to detect or sense whether the piston of the double-acting hydraulic cylinder 22 has reached at least one predetermined position. When the at least one predetermined position is reached, the end position sensors 28 can generate a corresponding signal, which is in particular transmitted to the controller 8. The at least one predetermined position detected by the limit switches includes, e.g., at each end of the double-acting hydraulic cylinder 22, a position to decelerate the piston and a position for reversing the piston direction. A separate limit switch can be provided for each position. Instead of limit switches, a position sensor can also be provided on the hydraulic cylinder that senses the position of the piston, whereby the functionality of limit switches is implemented by a computer program module that evaluates the position sensed by the position sensor. Such a computer program module can be part of the computer program specified hereinabove and performed in the electronic controller 8.

Figure 2:
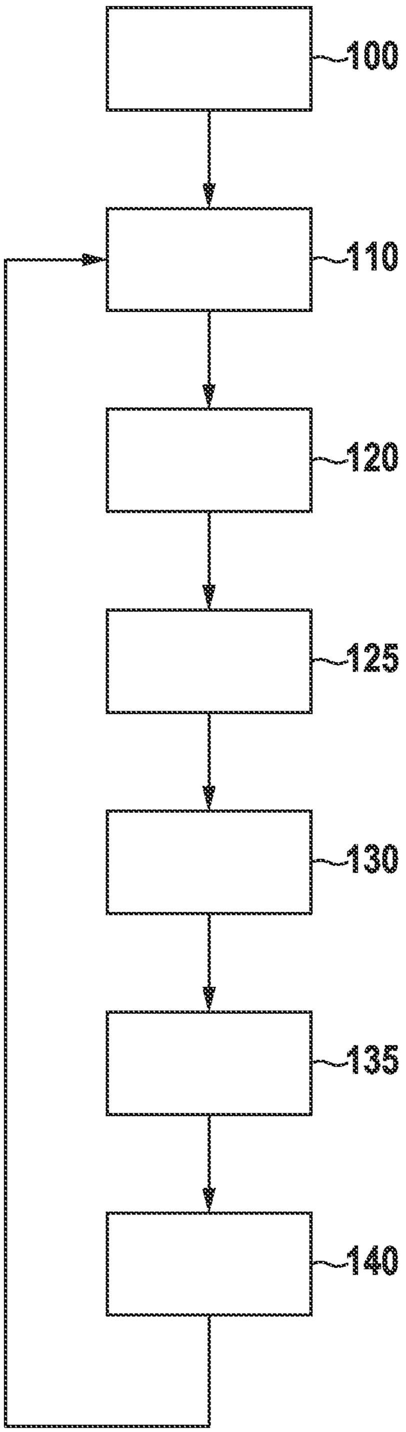
FIG. 2 shows a flow chart according to an exemplary embodiment of the method for controlling a hydraulic drive.

FIG. 2 shows a flow chart according to an exemplary embodiment of the method for controlling a hydraulic drive.

A situation is assumed in which a volumetric flow of hydraulic fluid is conveyed in a conveying direction, i.e., to one of the drive outputs of the hydraulic cylinder or into one of the chambers of the double-acting hydraulic cylinder. The hydraulic machine or the electric machine is controlled and/or regulated according to a rotational speed. The hydraulic machine is controlled to vary its displacement (swing angle) to a positive or negative displacement depending on the conveying direction. The signs, i.e. "positive" and "negative", of displacement, refer in this context to the different conveying directions. At a given rotational speed, the displacement is determined so that a desired (requested) volumetric flow (volumetric flow specification) between the chambers of the hydraulic cylinder is achieved on the consumer side. It is assumed that the rotational speed of the hydraulic machine is equal to the rotational speed of the electric machine, and the volumetric flow is accordingly equal to the product of rotational speed and displacement. More generally, a transmission ratio different from one between the hydraulic machine and electric machine can be considered. The rotational speed can, e.g., be selected such that the electric machine or its combination with the hydraulic machine is operated as efficiently as possible.

In step 100, a direction reversal is triggered, i.e., a reversal of the conveying direction. This can be accomplished in response to at least one signal (reverse signal) from a limit switch or from a corresponding computer program module. Also, the reversal could be in response to the expiration of a time period, e.g., the second change time period or the second hold time period, in particular if the cyclic sequence is chronologically predetermined.

In step 110, a direction reversal (e.g., during a reversal time period) is performed. The direction reversal can generally take place over a certain time period, i.e., a reversal time period. For example, initially, after a signal (reversal signal) from an end position sensor detecting a position for deceleration, the displacement is reduced to a relatively low level in terms of amount, and subsequently, after a signal (further reversal signal) from an end position sensor detecting a position for direction reversal, in particular the displacement is increased in terms of amount with the opposite sign. At a given set rotational speed, the displacement is varied during the direction reversal, in particular so that the volumetric flow specification is met during the reversal time period. The rotational speed can remain during the direction reversal, i.e. during the unchanged reversal time period.

After the direction reversal, the rotational speed is increased in step 120 (i.e., the electric machine is controlled accordingly). The increase is from a first rotational speed present at the end of the direction reversal to a second rotational speed, wherein in particular the second rotational speed can be predetermined. At the same time, the displacement is changed (i.e., the hydraulic machine is controlled or varied accordingly) so that the volumetric flow specification remains met. These two changes were made in particular so that the product of displacement and rotational speed remains equal to the volumetric flow specification. Step 120 is performed over a first change time period, whereby the increase in rotational speed over the first change time period in particular can be monotonic. Immediately following the direction reversal, the pressure on the side from which hydraulic fluid is conveyed is initially higher than on the side to which hydraulic fluid is conveyed, so that the pressure differential across the hydraulic machine acts as a hydraulic motor that generates torque. This torque has an accelerating effect on the rotational speed so that, by controlling the electric machine in order to increase the rotational speed, it is at least partially avoided that the electric machine functions regeneratively and builds up an opposing torque. Hydraulic energy is temporarily stored as kinetic energy corresponding to the moment of inertia of the rotating masses. The rotational speed increase in step 110 (i.e., during the first change time period) achieves the second rotational speed, which can be selected based on, e.g., the design of the hydraulic drive and hydraulic consumer, as well as corresponding operating parameters (e.g., hydraulic pressures). For example, the second rotational speed can be selected such that the corresponding displacement set in order to meet the volumetric flow specification is as close as possible to the maximum possible displacement of the hydraulic machine (e.g., >90%) in terms of amount. Likewise, the chronological length of the first change time period can be selected or determined based on the design of the hydraulic drive and the hydraulic consumer, as well as corresponding operating parameters.

In the optionally provided step 125 (which takes place after step 120) extending approximately over a first hold time period, the electric machine is controlled such that the rotational speed remains unchanged, i.e., the rotational speed remains at the second rotational speed. In order to, e.g., enable a short cycle time by way of a relatively long first hold time period. The displacement is varied or remains at a variance so as to meet the volumetric flow specification during the first hold time period.

In step 130 (which occurs after step 120), the rotational speed is decreased (based on the second rotational speed) (i.e., the electric machine is controlled accordingly) until the first rotational speed is reached again. At the same time, the displacement is changed (i.e., the hydraulic machine is controlled or varied accordingly) so that the volumetric flow specification remains met. These two changes were made in particular again so that the product of the displacement and the rotational speed remains equal to the volumetric flow specification. Step 130 is performed over a second change time period, whereby the reduction in rotational speed over the second change time period in particular can be monotonic. The temporarily stored kinetic energy is used accordingly in order to drive the hydraulic machine. The chronological length of the second change time period can be selected based on the design of the hydraulic drive and the hydraulic consumer, as well as corresponding operating parameters.

In the optionally provided step 135 (which is performed after step 130) extending approximately over a second hold time period, the electric machine is controlled so that the rotational speed remains unchanged, i.e., the rotational speed remains at the first rotational speed. The displacement is varied or remains at a variance so as to meet the volumetric flow specification during the second hold time period.

In step 140, a (next) direction reversal is triggered, i.e., a reversal of the conveying direction. As described in step 100, this can be accomplished in response to at least one signal (reverse signal) from a limit switch or from a corresponding computer program module. Also, the reversal could be in response to the expiration of a time period, e.g., the second change time period or the second hold time period, in particular if the cyclic sequence is predetermined in time.

The method is performed cyclically. In other words, after step 140 a direction reversal according to step 110 takes place again. As mentioned, the cycle sequence can be controlled by means of signals from position sensors and/or limit switches, whereby, for example, the chronological lengths of the first and the second time period are predetermined. Alternatively or additionally, chronological lengths of the first, the second, and optionally the first and second hold time periods and the reversal time period can be set or predetermined (and, e.g., programmed in the electronic controller or computer program). Such predetermined chronological lengths can be determined during a test phase.

The third time period is before the next subsequent direction reversal, and the third time period extends in particular to the respective next direction reversal. In other words, no direction reversal occurs between the first time period, the second change time period, and the third time period, or no direction reversal occurs within the time period that includes a first change time period, a second change time period, and a third time period that follow one another.

Figure 3:
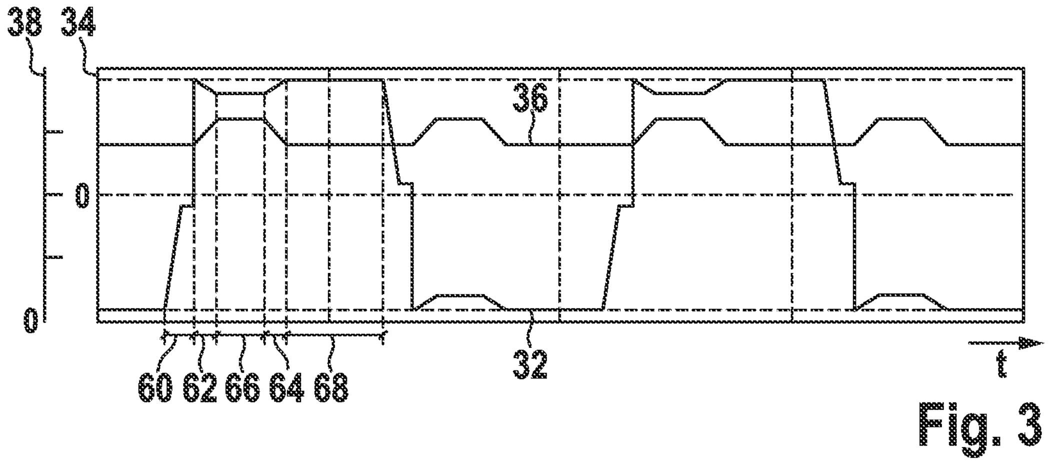
FIG. 3 shows the chronological profile of the swing angle and the rotational speed over multiple operating cycles resulting, e.g., according to the method shown in FIG. 2.

FIG. 3 shows the chronological profile of the swing angle and the rotational speed over several operating cycles, as results, e.g., according to the method shown in FIG. 2. In this drawing, a displacement profile 32 of the set swing angle and/or the adjusted displacement of the hydraulic machine (i.e., the swing angle or the displacement with which the hydraulic machine is driven) and a rotational speed profile 36 of the set rotational speed of the electric machine (i.e. the rotational speed, with which the electric machine is controlled, which also corresponds to the rotational speed of the hydraulic machine, optionally taking into account a transmission ratio) are plotted against time t (in any units, e.g. seconds). The swing angle or displacement is indicated as a relative swing angle or relative displacement on a displacement scale 34 (in any units, e.g., as a percentage between −100% and +100%, which corresponds to, e.g., the conveyor displacement). The rotational speed of the electric machine is shown according to a rotational speed scale 38 (in any units, for example, revolutions per minute).

It can be seen that after a direction reversal (reversal time period 60) of the volumetric flow (corresponding to step 110 in FIG. 2), the rotational speed is initially increased over a first change time period 62 (from the first to the second rotational speed, corresponding to step 120 in FIG. 2) and simultaneously the swing angle or displacement is varied so that the volumetric flow specification is met. In the illustrated example, the volumetric flow specification for the first change time period 62 is constant. Accordingly, the displacement is reduced in terms of amount. The rotational speed is then kept constant over a first hold time period 66 (corresponding to step 125 in FIG. 2), with the displacement, e.g., also remaining unchanged while the volume volumetric flow remains constant. Over a second change time period 64 (corresponding to step 130 in FIG. 2), the rotational speed is decreased until the second rotational speed is reached again. The displacement is increased in terms of amount while, e.g., the volumetric flow remains constant. Subsequently, over a second hold time period 68 (corresponding to step 135 in FIG. 2), the hydraulic machine or the electric machine continues to be controlled according to the first rotational speed, the displacement also remaining unchanged, e.g., at a constant volumetric flow specification. After the second hold time period 68, the next direction reversal follows. The reversal time period 60, the first and second change time periods 62, 64, and the first and second hold time periods 66, 68 together correspond to one-half cycle of cyclic operation. It can also be seen in the displacement profile 32 that the swing angle or the displacement is initially reduced to a relatively low level in terms of amount (e.g., after a signal from an end position sensor detecting a position for deceleration) and then (e.g., after a signal from an end position sensor detecting a position for direction reversal) the direction is reversed. The resulting effective volumetric flow profile is shown next in FIG. 4.

Figure 4:
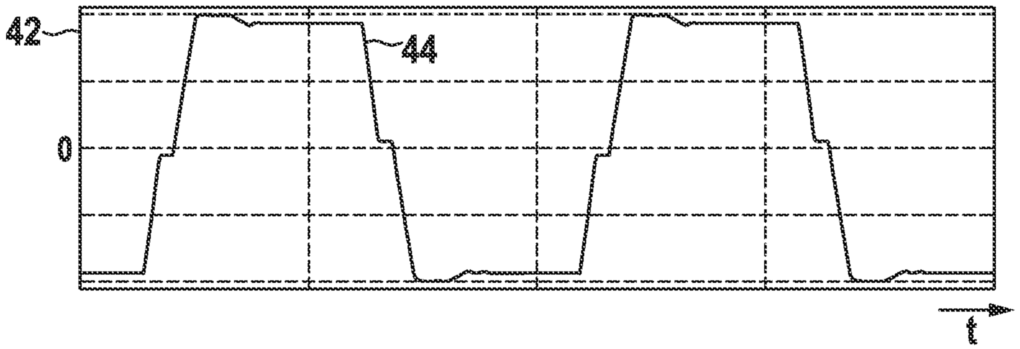
FIG. 4 shows the chronological profile of a volumetric flow of the hydraulic machine over multiple operating cycles, using the example of the compression device in FIG. 1.

FIG. 4 shows the chronological profile of a volumetric flow of the hydraulic machine over multiple operating cycles, using the example of the compression device in FIG. 1. In this drawing, the volumetric flow 42 (in any units, e.g. L/min) is plotted against the time t (in any units, e.g. seconds). A chronological volumetric flow profile 44 of the volumetric flow of the hydraulic machine when the hydraulic drive 4 is controlled according to the disclosure (see FIG. 2) is shown. The relative volumetric flow between the two chambers of the hydraulic cylinder is shown in this case (e.g., positive values correspond to a volumetric flow from the first chamber 26A to the second chamber 26B, and negative values correspond to a volumetric flow from the second chamber 26B to the first chamber 26AB). The volumetric flow profile 44 corresponds (as far as technically possible) to the volumetric flow specification and is practically indistinguishable from the volumetric flow profile obtained when the hydraulic drive 4 is controlled at constant rotational speed and constant swing angle. The operation of the compression device is thus not altered or affected.

Figure 5:
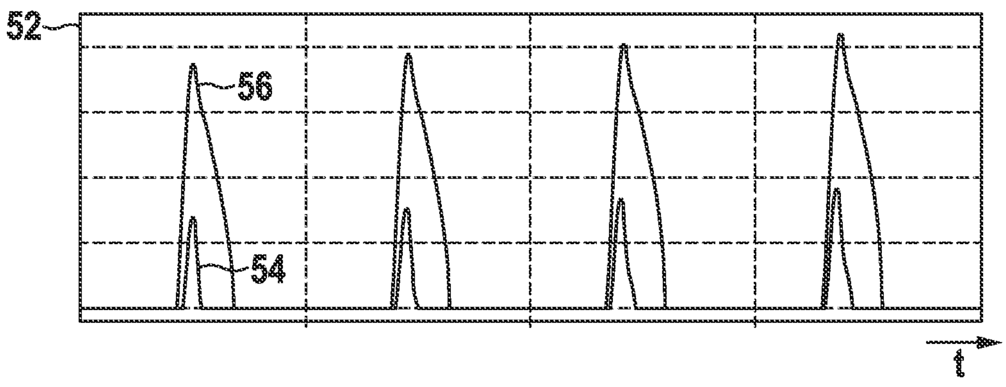
FIG. 5 shows the chronological profile of a DC link voltage over multiple operating cycles, using the example of the compression device in FIG. 1.

FIG. 5 shows the chronological profile of a DC link voltage over several operating cycles, using the example of the compression device in FIG. 1. In this drawing, the DC link voltage 52 (in any units, e.g. V or kV) is plotted against time t (in any units, e.g. seconds). Shown are a chronological first voltage profile 54 of the DC link voltage when the hydraulic drive 4 is controlled according to the disclosure (see FIG. 2) and a chronological second voltage profile 56 of the DC link voltage when the hydraulic drive 4 is controlled at constant rotational speed and constant swing angle.

For example, the DC link voltage is the DC voltage that is used to provide electrical power to an inverter of the electric machine. The voltage spikes shown occur during time periods in which the electric machine acts as a generator (these periods correspond to approximately the first change time period and partially the second change time period in FIG. 3). It can be seen in this drawing that the voltage spikes of the first voltage profile 54 are lower and shorter in time than those of the second voltage profile 56. Fewer measures are thus necessary to absorb the corresponding electrical power or to avoid the generation of electrical power. For example, braking resistors or throttle valves can be omitted, or capacitors having a lower capacity for intermediate storage of the electrical power or energy can be sufficient.

What is claimed is:

1. A method for controlling a hydraulic drive for a hydraulic consumer alternately pressurized in opposite directions during operation, wherein the hydraulic drive comprises a hydraulic machine which is driven by an electric machine, and includes variable displacement adjustable through zero, wherein a rotational speed of the hydraulic machine is adjustable by controlling the electric machine, comprising:

varying the variable displacement so that hydraulic fluid is alternately conveyed in opposite conveying directions, according to a cyclically varying volumetric flow specification, by the hydraulic machine, wherein, when alternating the conveying direction, a direction reversal is performed;

increasing the rotational speed during a first change time period, after a respective direction reversal, from a first rotational speed set at an end of the direction reversal to a second rotational speed; and reducing the rotational speed during a second change time period after the first change time period until the first rotational speed is reached, wherein the variable displacement is varied during the first and second change time periods depending on the rotational speed and the cyclically varying volumetric flow specification so as to correspond to the volumetric flow specification.

2. The method according to claim 1, wherein:

during a first hold time period after the first change time period and before the second change time period, the rotational speed remains unchanged; and the variable displacement during the first hold time period is varied depending on the rotational speed and the cyclically varying volumetric flow specification to correspond to the cyclically varying volumetric flow specification.

3. The method according to claim 1, wherein:

during a second hold time period after the second change time period, the rotational speed remains unchanged; and the displacement is varied during the second hold time period depending on the rotational speed and the cyclically varying volumetric flow specification to correspond to the cyclically varying volumetric flow specification.

4. The method according to claim 1, wherein:

the respective direction reversal extends over a reversal time period;

there is a displacement sign change during the reversal time period;

the displacement during the reversal time period is varied depending on the rotational speed and the cyclically varying volumetric flow specification to correspond to the cyclically varying volumetric flow specification; and the rotational speed during the reversal time period remains unchanged.

5. The method according to claim 3, wherein:

the second hold time period is before the next respective direction reversal or reversal time period; and the second hold time period extends until the next respective direction reversal or reversal time period.

6. The method according to claim 1, wherein:

at least one reversal signal is determined or sensed based on signals from at least one position sensor and/or end position sensor arranged on the hydraulic consumer; and the respective direction reversal is performed in response to the at least one reversal signal.

7. The method according to claim 1, wherein the first and/or the second rotational speed is predetermined.

8. The method according to claim 1, wherein a chronological length of the first change time period and a chronological length of the second change time period are predetermined.

9. The method according to claim 2, wherein a chronological length of the first hold time period is predetermined.

10. The method according to claim 2, wherein, during the first and second change time periods and/or during the first hold time period the variable displacement is varied so that a product of the displacement and rotational speed remains equal to the cyclically varying volumetric flow specification.

11. A computing unit comprising a processor configured to perform the method according to claim 1.

12. A hydraulic drive comprising:

an electric machine;

a hydraulic machine which is driven by the electric machine, and features variable displacement adjustable through zero, wherein a rotational speed of the hydraulic machine is adjustable by controlling the electric machine; and the computing unit according to claim 11.

13. A hydraulically driven compression device comprising the hydraulic consumer and the hydraulic drive according to claim 12.

14. A computer-readable disk on which is stored a computer program comprising instructions that, when the program is performed by a computer, prompt the computer to perform the method according to claim 1.

15. The method according to claim 3, wherein a chronological length of the second hold time period is predetermined.

16. The method according to claim 4, wherein a chronological length of the reversal time period is predetermined.

17. The method according to claim 3, wherein, during the first and second change time periods and/or during the second hold time period and/or during the reversal time period, the variable displacement is varied so that a product of the displacement and cyclically varying rotational speed remains equal to the cyclically varying volumetric flow specification.

* * * * *